(12) United States Patent
Strass (10) Patent No.: US 10,377,583 B2
(45) Date of Patent: Aug. 13, 2019

(54) METHOD AND DEVICE FOR CONVEYING LARGE-AREA PANELS OF EXTREME SIZE

(71) Applicant: Grenzebach Maschinenbau GmbH, Asbach-Baeumenheim (DE)

(72) Inventor: Manfred Strass, Harburg (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 331 days.

(21) Appl. No.: 14/433,992

(22) PCT Filed: Sep. 26, 2013

(86) PCT No.: PCT/DE2013/000549
§ 371 (c)(1),
(2) Date: Apr. 7, 2015

(87) PCT Pub. No.: WO2014/056469
PCT Pub. Date: Apr. 17, 2014

(65) Prior Publication Data
US 2015/0274440 A1  Oct. 1, 2015

(30) Foreign Application Priority Data

Oct. 9, 2012  (DE) .................. 10 2012 019 839

(51) Int. Cl.
*B65G 49/06*  (2006.01)
*B65G 47/91*  (2006.01)
(Continued)

(52) U.S. Cl.
CPC ......... *B65G 49/061* (2013.01); *B65G 47/918* (2013.01); *B65G 47/92* (2013.01);
(Continued)

(58) Field of Classification Search
CPC ... B65G 49/061; B65G 49/067; B65G 49/068
(Continued)

(56) References Cited

U.S. PATENT DOCUMENTS

| 3,465,934 | A | | 9/1969 | Ono et al. |
| 4,228,886 | A | * | 10/1980 | Moran ................. G01B 11/002 |
| | | | | 198/395 |

(Continued)

FOREIGN PATENT DOCUMENTS

| CN | 101932519 A | 12/2010 |
| CN | 102363474 A | 2/2012 |

(Continued)

OTHER PUBLICATIONS

Ren Ng et al, "Light Field Photography with a Hand-held Plenoptic Camera", Stanford Tech Report CTSR, Feb. 2005, pp. 1-11, XP012711052.*

(Continued)

*Primary Examiner* — Lynn E Schwenning
(74) *Attorney, Agent, or Firm* — Walter | Haverfield LLP; Sean F. Mellino; D. Peter Hochberg (57) ABSTRACT

A method and device for conveying large-area panels, particularly panes of glass, of extreme size over 40 meters long and over 6 meters wide, wherein the panel can be held from the bath side or the air side, said method comprising the following features: a) the panes of glass (10) delivered on conveyance rollers (17) are swung by means of a vertical hoisting device (20) either on the left side or right side at an acute angle, wherein the device (20) has finger-like carrying elements structured in a comb arrangement which grip through the conveyance rollers (17) and carry suction discs (12); b) swung in this way, the pane of glass (10) is gripped by means of a plurality of comb grippers (22) using suction discs (12), which grippers are synchronized in their sequence of movements, and placed on a stacking frame (15, 16), wherein the comb grippers (22) are moved on a plurality of guiding beams (2) arranged like a portal.

7 Claims, 9 Drawing Sheets

(51) Int. Cl.
B65G 57/08 (2006.01)
B65G 61/00 (2006.01)
B65G 47/92 (2006.01)

(52) U.S. Cl.
CPC ......... *B65G 49/067* (2013.01); *B65G 49/068* (2013.01); *B65G 57/08* (2013.01); *B65G 61/00* (2013.01); *B65G 2201/022* (2013.01); *B65G 2249/045* (2013.01)

(58) Field of Classification Search
USPC ................ 414/798.5; 700/247, 248; 212/236
See application file for complete search history.

(56) References Cited

U.S. PATENT DOCUMENTS

| | | | | |
|---|---|---|---|---|
| 4,787,812 | A * | 11/1988 | Gopfert | B66C 1/0212 294/188 |
| 6,364,386 | B1 * | 4/2002 | Quick | H05K 13/0408 29/743 |
| 6,807,461 | B2 * | 10/2004 | Kneifel, II | B25J 9/1682 118/500 |
| 7,063,499 | B2 * | 6/2006 | Miyamoto | H01L 21/6838 294/188 |
| 7,075,772 | B2 * | 7/2006 | Heiland | H01L 21/6831 269/8 |
| 7,653,977 | B2 * | 2/2010 | Wiedemann | B23K 37/047 198/575 |
| 8,788,086 | B2 * | 7/2014 | Franz | B65G 49/061 700/218 |
| 2001/0028837 | A1 * | 10/2001 | Ghinamo | B65G 49/061 414/627 |
| 2003/0062245 | A1 * | 4/2003 | Pfeilschifter | B65G 47/904 198/339.1 |
| 2004/0195850 | A1 | 10/2004 | Ogimoto | |
| 2004/0240981 | A1 * | 12/2004 | Dothan | B65G 49/067 414/795.4 |
| 2006/0099064 | A1 * | 5/2006 | Anaki | B25J 9/0084 414/797 |
| 2008/0011918 | A1 | 1/2008 | Pieter et al. | |
| 2010/0307999 | A1 | 12/2010 | Franz | |
| 2011/0174700 | A1 * | 7/2011 | Weigl | B65G 49/067 209/552 |
| 2012/0330453 | A1 * | 12/2012 | Samak Sangari | B25J 9/1697 700/121 |
| 2013/0017052 | A1 * | 1/2013 | Dorner | B25J 9/0018 414/794.4 |

FOREIGN PATENT DOCUMENTS

| | | | | |
|---|---|---|---|---|
| CN | 102620712 A | | 8/2012 | |
| DE | 197 12 368 A1 | | 10/1998 | |
| DE | 101 48 038 A1 | | 4/2003 | |
| DE | 10 2005 060452 A1 | | 6/2007 | |
| DE | 20 2008 001 422 U1 | | 3/2008 | |
| DE | 10 2012 019 839.6 | | 10/2012 | |
| EP | 1359101 | * | 11/2003 | ............. B65G 47/90 |
| FR | 1 541 340 A | | 10/1968 | |
| FR | 2 525 196 A1 | | 10/1983 | |
| WO | WO 2007/116080 A1 | | 10/2007 | |
| WO | WO 2009/094995 A1 | | 8/2009 | |
| WO | WO 2009094995 | * | 8/2009 | ............. B65G 49/06 |
| WO | WO-2010025706 A1 | * | 3/2010 | ........... B65G 49/067 |

OTHER PUBLICATIONS

Marc Levoy, "Light field sensing", Computer Science Department, Stanford University Workshop presentation in Charlotte, NC on Jun. 10, 2008.*
DE Office Action in priority, dated Sep. 6, 2013.
CN Office Action dated Nov. 28, 2016 for corresponding Chinese Patent Application No. 201380052915.0.
Communication pursuant to Article 94(3) from the European Patent Office dated Jun. 1, 2016 for corresponding European Patent Application No. 13798914.1.

* cited by examiner

METHOD AND DEVICE FOR CONVEYING LARGE-AREA PANELS OF EXTREME SIZE

CROSS-REFERENCE TO RELATED APPLICATION

This application is a U.S. national phase of International Application No. PCT/DE2013/00549 filed Sep. 26, 2013, and claims priority of German Patent Application No. 10 2012 019 839.6 filed Oct. 9, 2012, both of which are incorporated herein by reference in their entireties.

BACKGROUND OF THE INVENTION

1. Field of the Invention

The invention relates to the repositioning of panels of large surface area and of extreme size. In this document, "extreme size" is intended to be understood to mean dimensions of greater than 40 meters in length and greater than 6 meters in width. Said panels are preferably glass panels.

2. Description of the Prior Art

Glass panels of large surface area are produced in the form of float glass by continuously pouring molten glass onto a tin bath which is heated in an elongate tub, and a resulting glass ribbon being produced thereby. This glass ribbon has one side which lays on the tin bath, the so-called bath side. The other side of the glass ribbon, which side was cooled in the air, is designated the so-called air side. The bath side and the air side have different properties. Since the air side has fewer uneven areas for example, it is more suited to being coated. The float glass is then finished by making longitudinal cuts and cross-cuts in the glass ribbon which is produced in the float glass production process at a defined feed rate. Here, the longitudinal cuts are made by longitudinal cutting wheels which are installed in stationary fashion in an appropriate position above the glass ribbon, and the cross-cuts are made with the aid of cutting bridges and cross-cutting wheels which move transversely over the glass ribbon on said cutting bridges. Glass panels of considerable size can be produced in this way. A size of 6 meters by 3.21 meters is designated a so-called ribbon size or large format here. A panel size of 3.21 meters by 2 meters (up to 2.5 meters) is designated a so-called split ribbon size or medium format.

In order to transport glass panels of such a size from one site to another without said glass panels breaking, holding mechanisms, usually in the form of a sturdy frame, are moved toward the relevant glass panel for this purpose, connected thereto by means of suction cups, and then the holding mechanism to which the glass panel is attached by suction is conveyed further.

Prior art document DE 197 12 368 A1 discloses a method for moving objects from a first location to a second location using a holding mechanism which binds the object to it during the movement process, the objective intended to be achieved by said method being that of developing said method in such a way that objects can be securely moved under all circumstances in a simple manner. The objects to be moved are glass panes in this case.

Said objective is achieved, according to the specifications in the characterizing part of claim 1, in that the lifting mechanism is moved toward the object to be moved to the first or the second location taking into account the actual position and/or orientation thereof, wherein the holding mechanism is oriented, as required, by utilizing an ability of said holding mechanism to rotate freely and/or pivot freely about one or more axes.

Apparatus, as set forth in the claims, explains in more detail that the object to be moved is a glass pane, that the first location is an internal loader rack, and that the second location is a conveyor belt and the holding mechanism is a suction frame.

DE 101 48 038 A1 describes a device for transferring panels from a panel conveyor to a stacking framework or the like, having a robot with a robot arm which has, at its free end, a suction frame or the like for receiving a panel from the panel conveyor, and which is provided with a number of degrees of freedom that is adequate for its movement function.

The objective of developing a device of this kind is to form a device for transferring panels from a panel conveyor to a stacking framework such that, in the case of a glass panel, the air side of the glass is adversely affected as little as possible.

Said objective is achieved in that the panel conveyor is provided with a cutout into which the robot arm is able to enter, and with cutouts which also allow the suction frame or the like to enter. Furthermore, the suction frame or the like is intended to be arranged at the free end of the robot arm such that it can be pivoted into an upwardly pointing position in order to take hold of a panel on its side which faces the panel conveyor from the position entering the cutouts in the panel conveyor.

The stacking framework used here is fastened to the floor such that it cannot move, and consequently it can be loaded only from that side which faces the robot arm. In addition, the stacking framework, each time it is loaded with a further glass panel, has to be moved away from the robot arm by the small distance of the thickness of a glass panel since the distance of the robot arm has a fixed value. To this end, so-called carriages are necessary in practice in the case of the current prior art, said carriages moving the stacking framework away from the robot arm by the distance of one glass panel thickness in each case prior to said stacking framework being loaded with a new glass panel, in order to make space for a further glass panel. Furthermore, a turntable is required for the purpose of loading the stacking framework from the other side. In order to load the stacking framework with large and heavy glass panels, the carriages required and the turntable necessary to bear the resulting load are of complicated construction and are very expensive to produce.

WO 2009/094995 A1 by the same applicant describes a portal repositioning device for glass panels of large surface area.

The prior art has further disclosed, without documentary evidence being provided, that glass panels of up to 16 meters in length and 4 meters in width have been handled with components of very extreme dimensions. However, the limits of normal technology are reached at these dimensions.

BRIEF SUMMARY OF THE INVENTION

The apparatus according to the invention and the corresponding method are therefore based on the objective of, in a normal state, capturing very large glass panels of extremely large dimensions, that is to say of greater than 40 meters in length and greater than 6 meters in width, from the production line in an extremely short period of time, picking up said glass panels such that they do not vibrate and stacking said glass panels in a secure manner. Since a panel of this kind also has to be coated and a coating of this kind is usually to be applied to the smoother side, specifically the air side, it is necessary for it to be possible to capture said panel from the bath side too.

This objective is achieved by a portal repositioning device having the features and a corresponding method as set forth in the claims.

BRIEF DESCRIPTION OF THE DRAWINGS

The invention will be described in greater detail below with reference to figures, specifically in which.

DETAILED DESCRIPTION OF THE INVENTION

Figure 1:
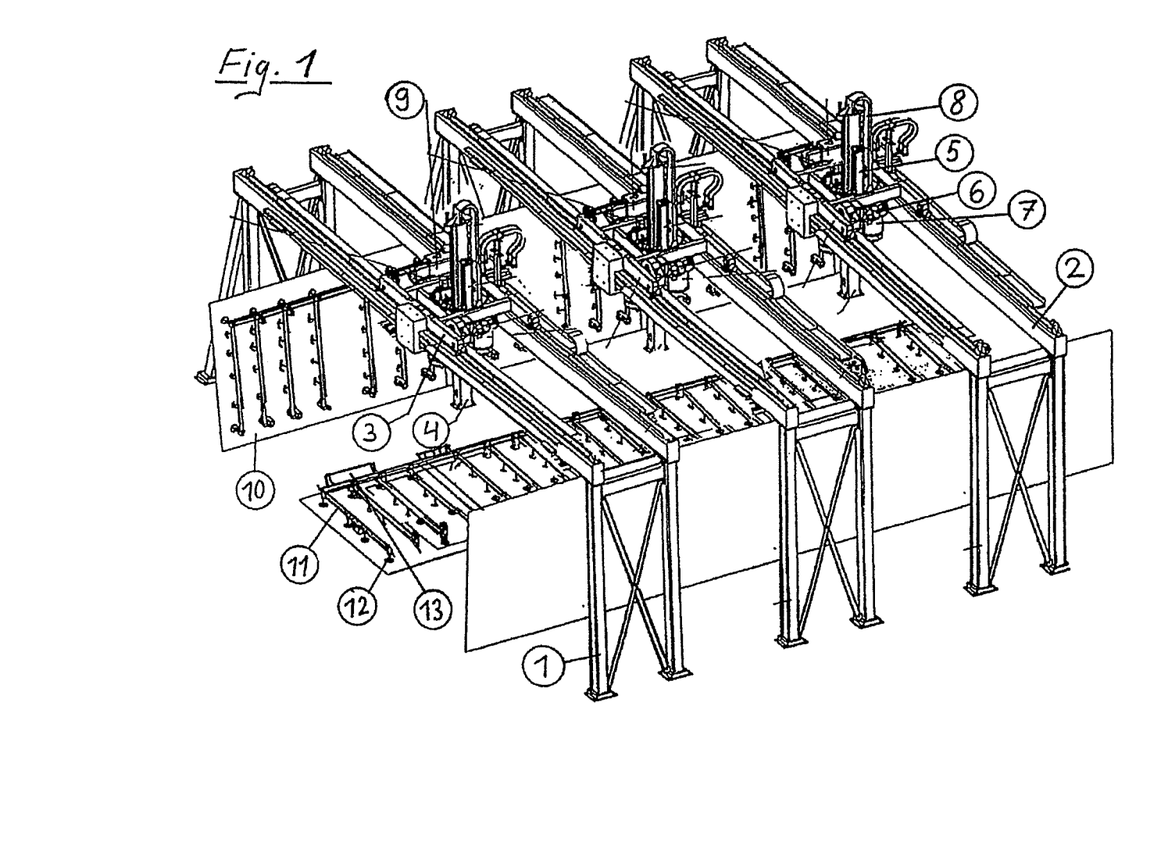
FIG. 1: shows a perspective illustration of one part of the entire apparatus

FIG. 1 shows a perspective illustration of one part of the entire apparatus according to the invention. Since the apparatus according to the invention involves conveying glass panels of extreme size, specifically of the order of greater than 40 meters in length and greater than 6 meters in width, it is clear that the entire conveying system cannot be illustrated in its entire length in FIG. 1. This does not appear to be necessary either since the structure of the conveying means does not change over the entire length of the system. A system for conveying a glass panel of this size appears to be one of a kind. Therefore, there are obviously no models for solving the objective presented here either.

FIG. 1 shows how the portal supports 1, which are connected by the wide-spanning guide beams 2, to a certain extent form a wide portal which gave a portal repositioning device of this kind its name. This stable construction ensures that firstly there is enough space between the portal supports 1 to allow even very large glass panels 10 to be received and moved to the desired place, and secondly that the positioning accuracy of the respective column carriage 3, which supports a lifting column 4 in each case, is retained even when very large and very heavy glass panels 10 are handled. This is achieved in particular by the overall weight which results from the weight of a glass panel 10 and the additional weight of the construction holding, the weight being compensated in the manner of a balance in such a way that only the weight of the respective glass panel 10 is taken as a basis as a control parameter. The difference in weight between the overall weight of a glass panel 10, which weight is to be controlled, and the device capturing it, which device substantially comprises the suction devices 12 and the construction supporting them, is brought about by controlling compressed air in the counterbalance weight 5. That is to say, this difference in weight is applied by way of a pressure cylinder to the opposite side of a lifting system in accordance with the lever principle and thereby balances out the difference in weight. In this way, the parameters which correspond to the actual weight of the glass panel 10 which is to be repositioned in each case are passed to the controller of the portal repositioning device. The compressed air required for this operation is stored in the compressed-air container 7. This results in the overall effect that the toothed belts which transmit the movement of a specific glass panel 10 are not subjected to impermissible loading. An additional result is that the flanks of the toothed belts which are used are subjected to loading only on one side and therefore control can be performed very precisely overall. It is of course also possible to, as it were, "overcompensate" for the weight of a glass panel 10 with this apparatus and make said glass panel appear to be lighter than its actual weight for the repositioning operation. A procedure of this kind may appear to be appropriate in individual cases when repositioning glass panels 10 which are particularly heavy. The horizontally acting carriage drive 6 in the form of a servo motor moves the respective column carriage 3. The energy supply and controller for the respective lifting column 4 run in the cable duct 8 shown. A vacuum pump 9 supplies the negative pressure required for the respective suction devices 12, wherein the suction devices 12 are fastened to the transverse beams 11 which run transversely in relation to a roller conveyor and which are depicted in horizontal style here. An electrical switchgear cabinet 13 is installed in an electrical switchgear cabinet 13 in the region of the forwardmost suction device 12.

In FIG. 1, only 3 examples of the above-described portal support structure are illustrated one behind the other by way of example. It goes without saying that the number of portal doors required increases as the length of the glass panel 10 which is to be conveyed increases, wherein the total weight of a glass panel 10 is distributed between the portal doors available. It goes without saying that the weight of a glass panel 10 which is to be conveyed additionally also increases as the width of said glass panel increases. This of course also has an effect on the concentration of the portal doors which are arranged next to one another, that is to say likewise has an effect on the number of said portal doors.

Figure 2:
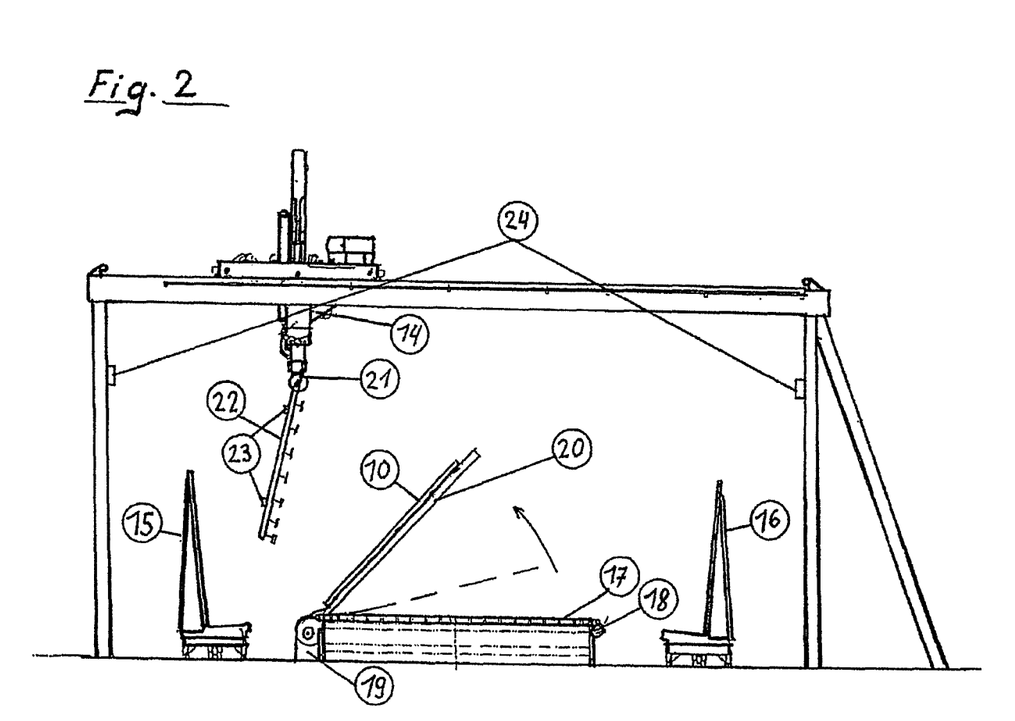
FIG. 2: shows a sectional drawing through the entire apparatus

FIG. 2 illustrates a sectional drawing through the entire apparatus. The abovementioned devices are for the most part also shown in the sectional drawing of said figure. The column drive 14 which, in the form of a servo motor, drives the vertical movement of the lifting column 4 is additionally shown here. A stacking framework 15 is illustrated in section on the left-hand side, and a stacking framework 16 is illustrated in section on the right-hand side.

Figure 4:
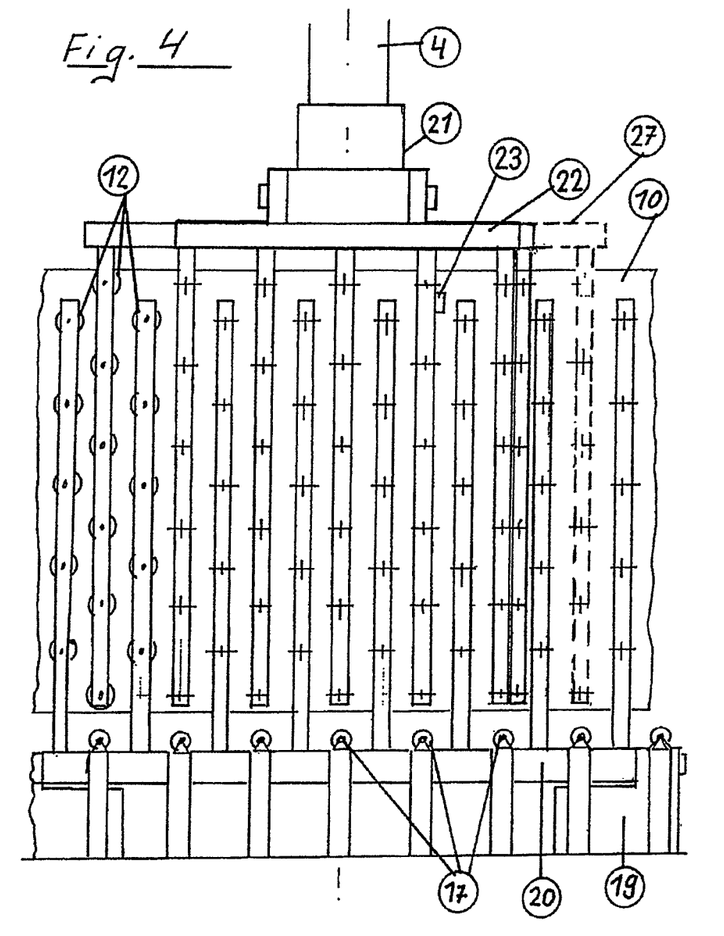
FIG. 4: shows a detailed drawing of a comb-type gripper 22

A glass panel 10 is mounted in an inclined position on a vertical-lifting apparatus 20 in the center of the figure. Said apparatus has a comb-like structure, wherein the finger-like supporting elements of said comb-like structure are fitted with suction devices 12 which are not shown in this illustration. Reference is made to FIG. 4 for more detailed explanations. The glass panel 10 was pivoted into this shown position on the vertical-lifting apparatus 20 by means of its pivot drive 19, wherein this vertical-lifting apparatus 20 has lifted-off the glass panel 10 from below by the conveying rollers 17 by means of the mentioned comb-like structure. The drive by means of which the conveying rollers 17 have moved the glass ribbon, which is to be conveyed, into the region of the system according to the invention is designated 18. The vertical-lifting apparatus 20 can, by means of its suction devices 12, pivot a glass panel as far as into an inclined position of approximately 90 degrees.

In FIG. 2, the lifting column 4 has a rotating and pivoting device 21 which is associated with a comb-type gripper 22.

Distance sensors 23 serve for orderly control of the illustrated comb-type gripper 22. In the position shown, the comb-type gripper 22 is able to capture the glass panel 10 from above, in this case from the air side, and set it down on the right-hand side stacking framework 16 after the vertical-lifting apparatus 20 is pivoted.

In order to control the entire conveying system, so-called field sensors 24 are respectively installed on each portal support, said field sensors being aligned with one another. The importance of said field sensors will be explained in the text which follows.

Figure 3:
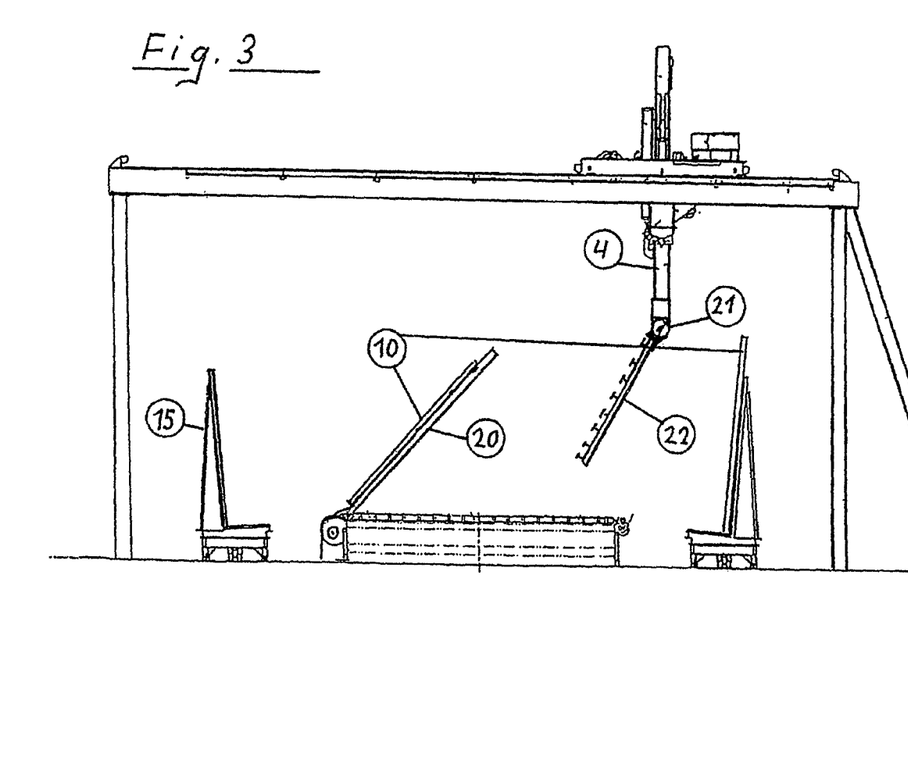
FIG. 3: shows a further sectional drawing through the entire apparatus

FIG. 3 shows a further sectional drawing through the entire apparatus. This figure illustrates how a comb-type gripper 22, which is moved by means of a lifting column 4 using a pivoting and rotating device 21, reaches through a vertical-lifting apparatus 20 from below and captures a glass panel 10 on the bath side. As a result, the vertical-lifting apparatus 20 pivots downward and the comb-type gripper 22 lifts up the glass panel 10 and sets it down on the left-hand side stacking framework 15 with the bath side at the top. Another glass panel 10 which has already been set down is shown on the right-hand side stacking framework 16.

FIG. 4 shows a detailed drawing of a comb-type gripper 22. This comb-type gripper 22 is held and guided by means of the pivoting and rotating device 21 and is moved by means of the lifting column 4 which is illustrated in the center.

Since each comb-type gripper 22 has to be able to rotate about the central axis of its lifting column 4 during the course of its movement program in order to be able to change its position when portal supports are close by, provision is made according to the invention for each comb-type gripper 22 to be able to change the width of its capture range on both sides by means of a telescopic apparatus 27 in each case. To illustrate this, the right-hand side of the comb-type gripper 22 shown is depicted using dashed lines in FIG. 4. Suction devices 12 for capturing a glass panel 10 are shown on the left-hand side in said figure. Since the glass panel 10 is transparent, the finger-like supporting elements of the comb-like lifting structure of the vertical-lifting apparatus 20 together with the suction devices 12 thereof are visible in this illustration. Further suction devices are indicated merely by means of crosses.

The drive 19 for the vertical-lifting apparatus 20 and the conveying rollers 17, in cross section, are shown at the bottom edge of the figure.

Figure 5:
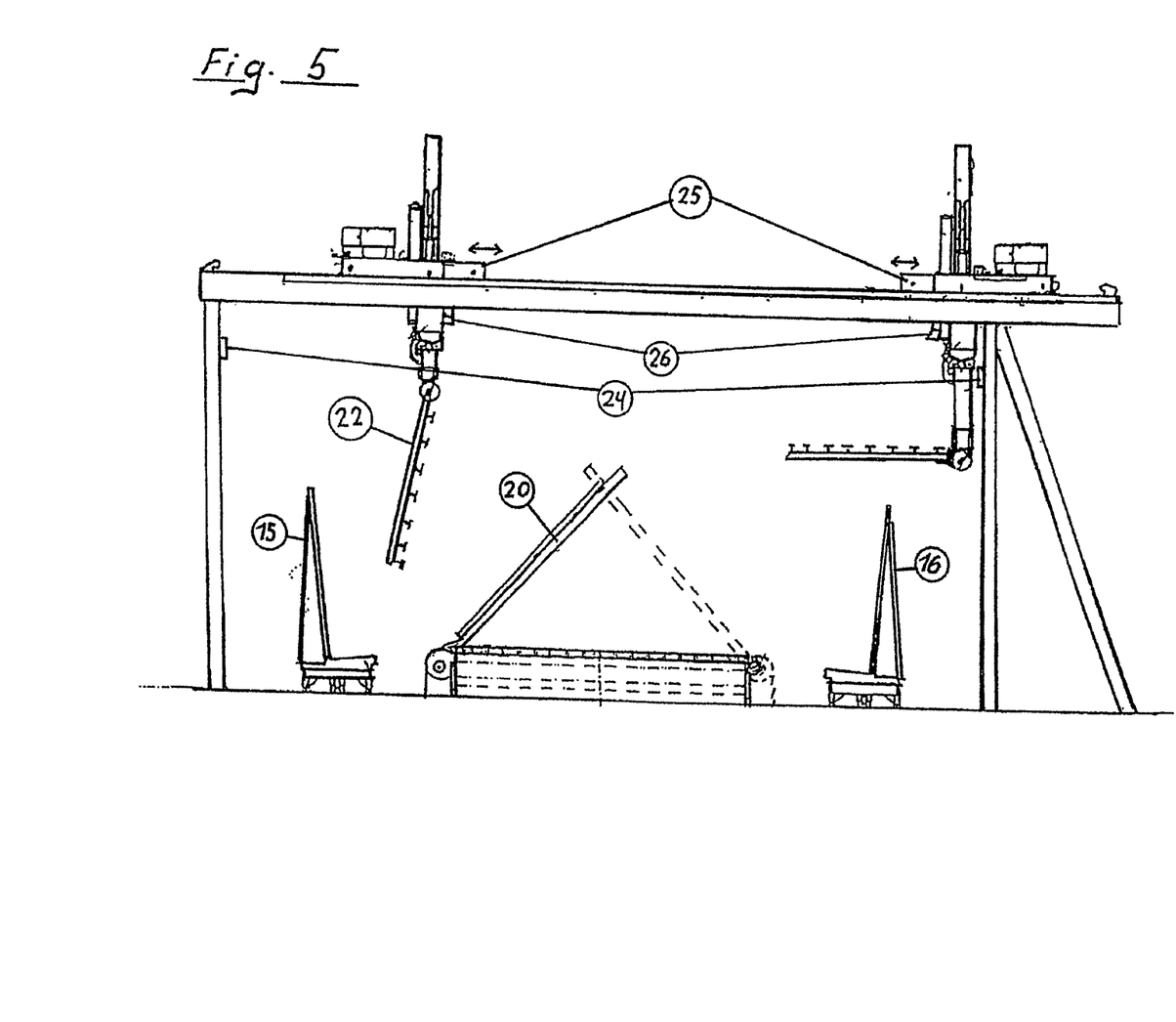
FIG. 5: shows a sectional drawing with 2 lifting columns 4

FIG. 5 shows a sectional drawing with 2 lifting columns.

This figure shows, in particular, that the vertical-lifting apparatus 20 can be stopped on the left-hand side or on the right-hand side. For demonstration purposes, 2 different comb-type grippers 22 are shown in order to illustrate that both the left-hand side stacking framework 15 and also the right-hand side stacking framework 16 can be loaded directly by the vertical-lifting apparatus 20 in this way. Said figure again shows the field sensors 24 to which reference will be made in the text which follows. Additional sensors 26 for detecting the grippers make it easier to finely adjust the comb-type grippers 22 in relation to one another. Extendable stabilizers 25 are additionally provided in order to support the column carriages 3 in the case of particularly heavy loads.

Figure 6:
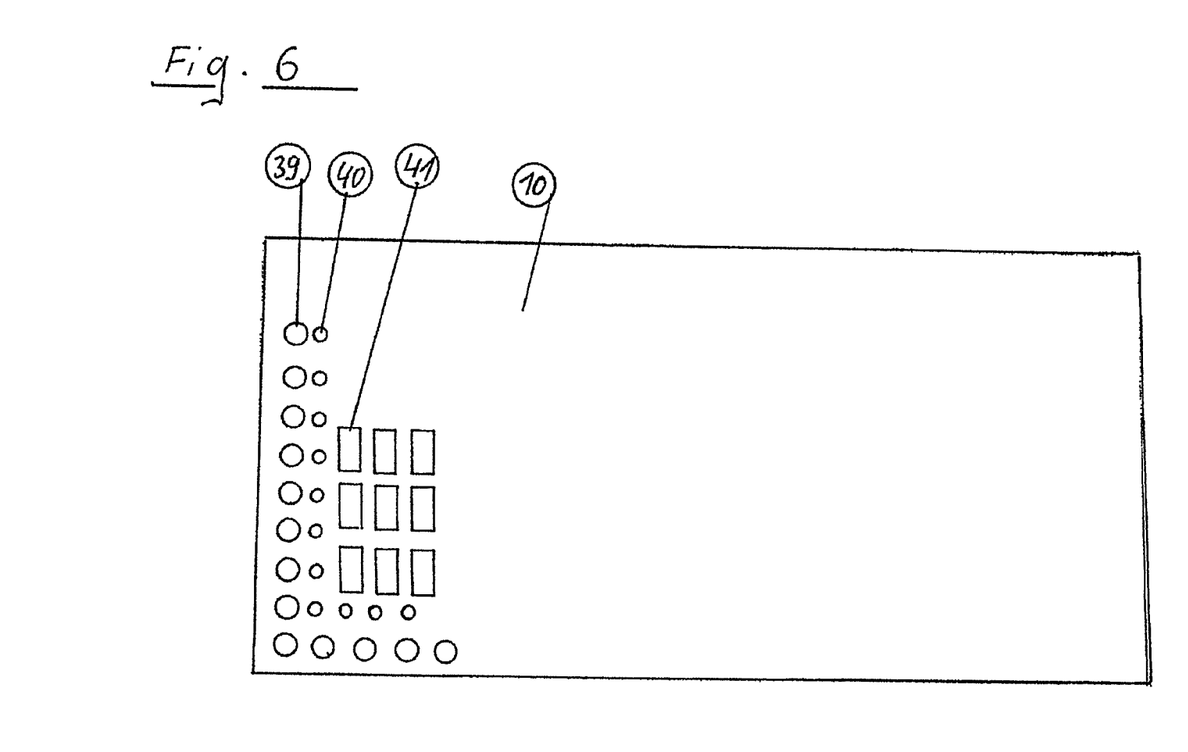
FIG. 6: shows a distribution diagram of gripping elements

FIG. 6 outlines a distribution diagram of gripping elements. Up until this point, the structure and the function of the comb-type grippers 22 have been discussed, with suction devices 12 merely being mentioned, to a certain degree as sole function supports. FIG. 6 explains in greater detail that it is necessary to fit the comb-type grippers used with different types of suction devices 12 for the purpose of conveying and protecting a glass panel 10 of such a huge size.

Therefore, by way of example, said figure illustrates that, in the edge region, so-called power suction devices 39, in addition to so-called precision suction devices 40, which serve more for exact fixing, are preferably used on a stylized glass panel 10.

Since it is important for the purpose of subsequent coating of a glass panel 10 that there are no imprints of suction device rings in the middle, so-called electrostatic grippers and/or ultrasonic grippers 41 are preferably used in this region. Electrostatic grippers of this kind are known from the prior art and can transmit forces of up to 20 N/cm$^2$ transversely to the workpiece surface (ref no.: 1981 RWTH Aachen). Ultrasonic rippers which are not described in any detail are preferably also additionally used in this case.

Figure 7:
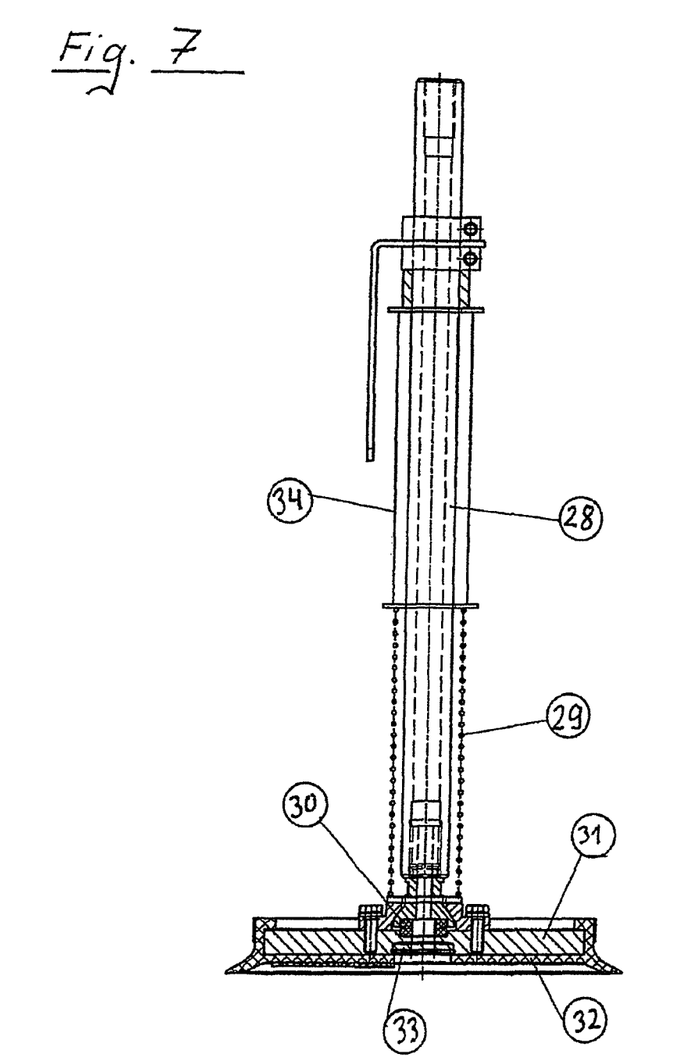
FIG. 7: shows a section through a power suction device 39

FIG. 7 illustrates a section through a so-called power suction device 39. This type of suction device substantially comprises a suction device shank 28, which plugs into a guiding and holding tube 34, and a suction plate 31 which is fastened to said guiding and holding tube. A compensation spring 29, which is mounted between the guiding and holding tube 34 and the suction plate 31, firstly ensures that the suction plate 31 is placed gently onto the glass panel 10 and secondly supports the flexible suction plate holder 30 in the event of inclined positioning. This suction plate holder is produced from a soft but highly shock-absorbing material and forms a harmonious connection between the suction device shank 28 and the suction plate 31. The circular suction device sleeve 32, by way of its particularly adhesive edge lip, establishes the actual connection to the glass panel 10. The suction plate 31 has, in its center, a circular filter element 33. Said filter element serves the purpose of keeping fine glass particles away from the vacuum pump 9. Said filter element can either be cleaned manually or replaced at certain intervals. The flow resistance of the filter element 33 of each suction device 39 can be detected in a particular stage of development by a sensor, not additionally shown, and displayed on a monitor.

Provision can further be made for individual suction devices to be able to be individually switched off and/or to be subjected to the action of an adjustable vacuum.

Figure 8:
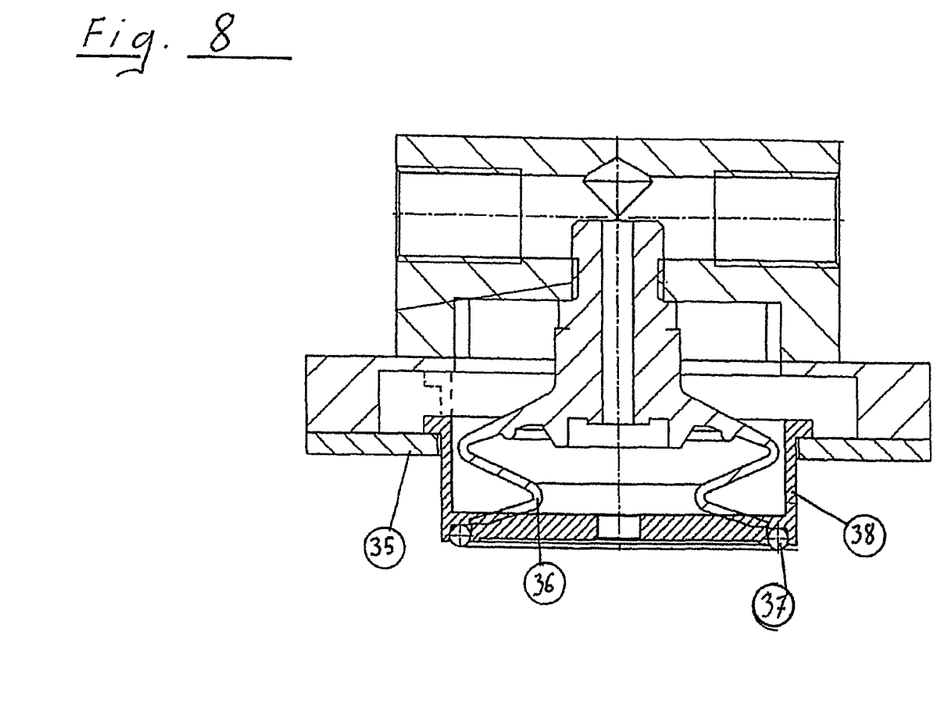
FIG. 8: shows a section through a precision suction device 40.

FIG. 8 shows a section through a so-called precision suction device 40. The special effect of this suction device is shown in this illustration. Since it is important for the panes which are to be picked up to be transported and fitted in an absolutely flat position, it is also necessary, in the case of each suction device head, for the surface of the respective suction device head which makes contact with the respective pane to be absolutely flat. This is achieved in the illustration shown by the sealing ring 37 being guided in a suction device head 38 which is composed of solid material. In this case, the suction device head 38 slides together with the rubber bellows 36 in the holding plate 35. Undulating bending of the held pane at the locations of the contact points of the respective suction devices, as is feared with flexible sealing lips in other embodiments of the prior art, is precluded in this case. Here, the suction device head 38 can, for example, also be approximately square or have any desired flat shape which induces as little mechanical stress as possible in the respectively held pane. Therefore, it is possible in this connection, for example, for an elliptical surface to contribute to reducing the stresses in the respective pane as it is picked up and transported.

Figure 9:
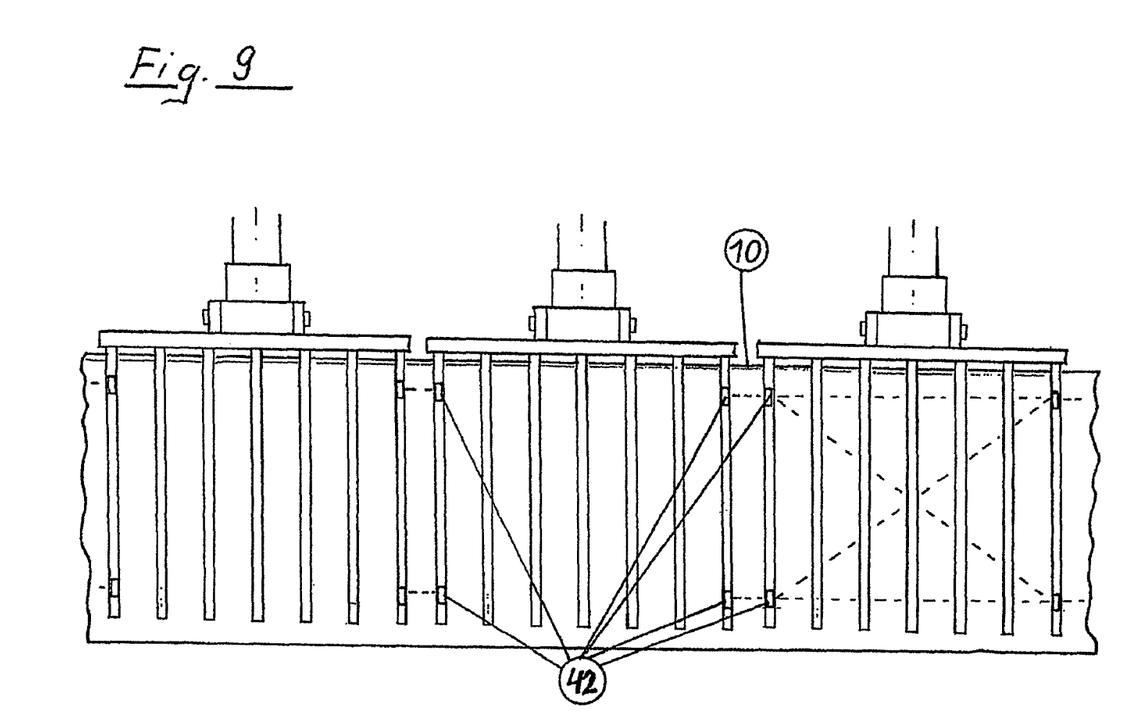
FIG. 9: shows an illustration of the synchronization of the comb-type grippers 22

FIG. 9 shows an illustration of the synchronization of the comb-type grippers 22. In said figure, three comb-type grippers 22 are shown next to one another by way of example, said comb-type grippers each having two laser sensors 42 at the two ends of their outer finger-like supporting elements. These laser sensors 42 are able to emit laser beams for the purpose of communication with the respectively adjacent comb-type gripper 22, but also to receive communication signals of this kind. Central control is possible in this way for aligning all comb-type grippers, which are required for conveying the respective glass panel 10, in a straight line horizontally and vertically. Since adjacent laser sensors 42 of this kind can also communicate diagonally, it is possible in this way to detect twisting of individual comb-type grippers 22 and to correct this using control means.

The plane of all of the respectively used comb-type grippers 22 which is defined using control means in this way forms the output basis for determining the distances between the individual suction devices, called adhesion elements in this location, or electrostatic grippers from the glass panel 10. Since each of the adhesion elements in question has a different pressure behavior or damping behavior during the adhesion process, a relatively constant contact pressure can be achieved in this way by means of the buildup of an individual suction pressure, or adhesion pressure, at least in groups, over the entire surface of a glass panel 10. Additional distance sensors which are oriented in groups are provided for this purpose, said distance sensors not being additionally depicted and also not being provided with reference symbols for reasons of clarity. It goes without saying that a sensor of this type could, in principle, be associated with each individual adhesion element, but there are technical and economical limits when handling a glass panel 10 of such a size owing to the resulting volume of data.

It should also be noted that the portal supports (1), the comb-type grippers (22) and the vertical-lifting apparatus (22) can of course also be employed separately.

In respect of the field sensors 24 used, reference is made to the recent development of the so-called mini lenses which, in the form of hundreds of mini lenses, collect optical information in accordance with the optical field principle, it then being possible for said optical information to later be combined using data technology to form images with a desired resolution and/or a desired viewing angle. Mini lenses of this kind are compatible with 3-D images, are cheap to produce and follow the insect-eye principle.

Control of the complex movement processes and signal processing of the sensors used require a special control program.

The invention has been described in detail, with particular reference to the preferred embodiment, but variations and modifications may occur to those of ordinary skill in the art to which the invention pertains from the foregoing description and from the appended claims.

The invention claimed is:

1. An apparatus for conveying glass panels, comprising the following features:
   a conveying line which is fitted with conveying rollers;
   a plurality of portal supports which are arranged in a linear manner one behind the other and are connected by means of guide beams and support column carriages;
   a plurality of comb-type grippers which are positioned by means of a pivoting and rotating device in a manner in which they are each moved horizontally on the guide beams by means of a column carriage and are vertically guided by a lifting column, wherein the comb-type grippers are fitted with suction devices, and wherein each comb-type gripper can change the width of its capture range on both sides by means of a telescopic apparatus;
   a stacking framework for setting down a glass panel such that it is inclined to the left and/or a stacking framework for setting down a glass panel such that it is inclined to the right, wherein glass panels of about 40 meters in length and about 6 meters in width are conveyed, wherein the panels can be held from the bath side or from the air side,
   a vertical-lifting apparatus is provided in the length and the width of the respective panel, wherein said vertical-lifting apparatus can be pivoted at an angle of up to 90 degrees such that it is stopped on the left and/or right side,
   distance sensors to control the movement of the individual comb-type grippers, and,
   wherein extendable stabilizers are additionally provided on the corresponding column carriages, and wherein laser sensors are used to align the comb-type grippers with one another vertically and horizontally, and wherein, in order to control the entire conveying system, field sensors are installed on each portal support, said field sensors being aligned with one another and, in the form of hundreds of mini lenses, collecting optical information in accordance with the optical field principle, it then being possible for said optical information to later be combined using data technology to form images with a desired resolution and/or a desired viewing angle.

2. An apparatus according to claim 1, wherein power suction devices and/or precision suction devices are used on the vertical-lifting apparatus and/or on the comb-type grippers, wherein a power suction device has a circular filter element and the flow resistance of a filter element is detected and displayed on a monitor, and wherein a precision suction device has a sealing ring which is guided in a suction device head which is composed of solid material.

3. An apparatus according to claim 1, wherein electrostatic grippers and/or ultrasonic grippers are used for conveying purposes on the air side in the case of glass panels which are to be coated.

4. A method for conveying glass panels comprising the following features:
   delivering glass panels on conveying rollers;
   capturing the glass panels by means of suction devices on a large number of guide beams, the beams forming a portal, by means of a large number of comb-type grippers, of which the movement sequences are synchronized, and set down on a stacking framework in a desired location, wherein the comb-type grippers are moved on the large number of guide beams and wherein each comb-type gripper can change the width of its capture region on both sides by means of a telescopic apparatus, wherein glass panels of about 40 meters in length and about 6 meters in width are conveyed, wherein said panels can be held from the bath side or from the air side, the glass panels, which are delivered on conveying rollers, are pivoted at an acute to right angle either on the left or the right side as required by means of a vertical-lifting apparatus which extends over the entire length of the glass panel,
   controlling the movement of individual comb-type grippers using distance sensors,
   wherein extendable stabilizers are additionally provided on the corresponding column carriages, and wherein laser sensors are used to align the comb-type grippers with one another vertically and horizontally, wherein, in order to control the entire conveying system, field sensors are installed on each portal support, said field sensors being aligned with one another and, in the form of hundreds of mini lenses, collecting optical information in accordance with the optical field principle, it then being possible for said optical information to later be combined using data technology to form images with a desired resolution and/or a desired viewing angle.

5. The method according to claim 4, wherein power suction devices and/or precision suction devices are used on the vertical-lifting apparatus and/or on the comb-type grippers, wherein a power suction device has a circular filter element and the flow resistance of a filter element is detected and displayed on a monitor, and wherein a precision suction device has a sealing ring which is guided in a suction device head which is composed of solid material.

6. The method according to claim 4, wherein electrostatic grippers and/or ultrasonic grippers are used for conveying purposes on the air side in the case of glass panels which are to be coated.

7. The method according to claim 4, wherein the comb-type grippers and the vertical-lifting apparatus are employed separately.

* * * * *